(No Model.)

H. C. ALDEN.
STRAINER FOR LIQUID VESSELS.

No. 249,494.  Patented Nov. 15, 1881.

Witnesses.
T. W. Bakewell
L. C. Fitler.

Inventor
Harry C. Alden
by his attorneys
Bakewell & Kerr

United States Patent Office.

HARRY C. ALDEN, OF PITTSBURG, PENNSYLVANIA, ASSIGNOR OF ONE-HALF TO THOMAS LIGGETT, OF SAME PLACE.

STRAINER FOR LIQUID-VESSELS.

SPECIFICATION forming part of Letters Patent No. 249,494, dated November 15, 1881.

Application filed October 3, 1881. (No model.)

*To all whom it may concern:*

Be it known that I, HARRY C. ALDEN, of the city of Pittsburg, in the county of Allegheny and State of Pennsylvania, have invented a new and useful Improvement in Strainers for Liquid-Vessels; and I do hereby declare the following to be a full, clear, and exact description thereof, reference being had to the accompanying drawings, forming a part of this specification, in which—

Figure 1:
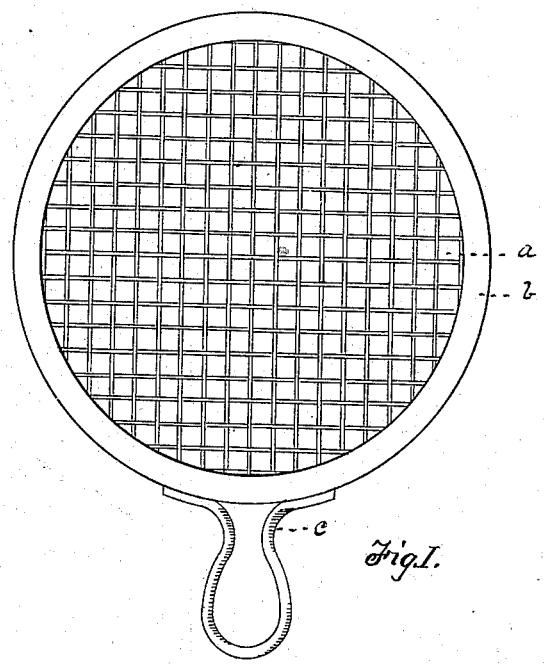
Figure 2:
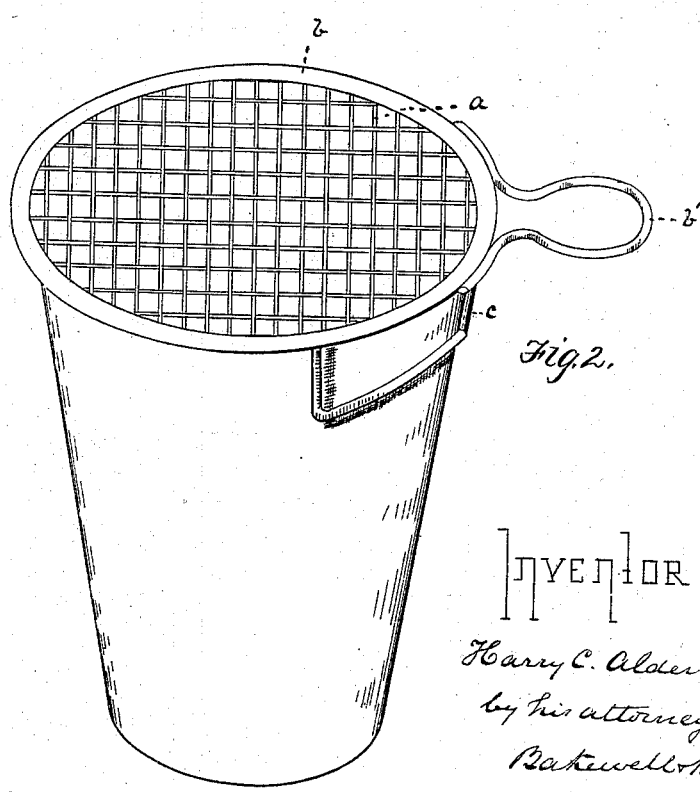

Figure 1 is a plan view of my improved strainer; and Fig. 2 is a perspective view of the same.

Like letters refer to like parts wherever they occur.

My invention relates to strainers for separating ice and other solid substances from the liquid portion of mixed drinks and other beverages; and it consists of a strainer composed of a web surrounded by a rigid rim, to which rim is attached a handle and a stop or rest, the whole being arranged to fit over and outside of the top of the vessel in which the beverage is compounded, as will hereinafter more fully appear.

Heretofore the kind of strainer most generally used for this purpose was a scalloped or shell-shaped spoon provided with perforations, which spoon was placed inside of the glass, so as to retain the ice and other substances and allow the liquid to pass through the perforations. This device, however, did not fully accomplish the purpose and could not be used without a certain amount of skill. Moreover, it did not prevent all of the ice, &c., from passing out with the liquid, and the straining process was comparatively slow and tedious, compared with that effected with my improvement, which I will now proceed to describe.

My strainer, as shown in the drawings, consists of a round and flat web, *a*, of wire or other suitable substance, surrounded by a rim, *b*, of stiff wire, so as to keep the web stiff, to which rim is attached a handle, *b'*. Below this handle, and attached to the rim *b* at about a right angle to the web, extends a rest or stop, *c*, which keeps the strainer from slipping off the top of the glass. Instead of the web *a*, a perforated sheet of metal may be used, but the web as described is preferable.

My device is used as follows: The beverage having been mixed or compounded in a tumbler or other vessel, the strainer is placed over the vessel, as shown in Fig. 2, and the liquid portion is poured through the web, which retains the solid portion of the compound.

The advantages of my strainer are, that it is light and very easily used. It is also much better adapted for the purpose, and accomplishes the object in a more effectual manner than any other strainer now in use. It may be used for the purpose of straining any kind of beverage which is mixed or compounded with solids which it is desirable to remove from the liquid after the mixing process is completed; and as it is the web and not the rim of the strainer which rests on the top of the vessel, the strainer may be constructed of sufficient size to be used with different-sized vessels, thereby avoiding the necessity of having different-sized strainers for different-sized glasses or vessels in which the beverage is mixed.

I do not desire to claim, broadly, a strainer for the purpose of separating ice and other solid substances from mixed drinks; but,

Having thus described my invention, what I claim, and desire to secure by Letters Patent, is—

A strainer for mixed drinks or beverages, consisting of an inner web having a rigid rim, to which rim is attached a handle and a stop or rest, the whole being arranged so that the web shall fit over and rest upon and outside of the top of the vessel in which the beverage is compounded, substantially as and for the purpose specified.

In testimony whereof I have hereunto set my hand.

HARRY C. ALDEN.

Witnesses:
JOHN S. KENNEDY,
T. W. BAKEWELL.